Dec. 20, 1927.

F. B. HAMBLIN 1,653,043

OPERATING HANDLE FOR LEVER SWITCHES

Filed Sept. 27, 1926

Inventor:
Fred B. Hamblin,
by Rippey & Kingsland.
His Attorneys.

Patented Dec. 20, 1927.

1,653,043

UNITED STATES PATENT OFFICE.

FRED B. HAMBLIN, OF ST. LOUIS, MISSOURI, ASSIGNOR TO THE WEIGHTOGRAPH COMPANY, OF ST. LOUIS, MISSOURI, A CORPORATION OF MISSOURI.

OPERATING HANDLE FOR LEVER SWITCHES.

Application filed September 27, 1926. Serial No. 138,097.

This invention relates to operating handles for lever switches and more particularly to a device adapted for locking the beam or lever of a scale and for simultaneously operating an electric switch for controlling a light circuit for illuminating a part of the scale remote from the beam or lever.

In certain types of scales, an illuminating element is used for illuminating the graduated lever; for projecting scale indicia; for illuminating a movable chart; or for other purposes. When the scale is idle, it is desirable to lock the beam or lever against movement, at which time, there is no necessity for operating the illuminating device. When the scale beam or lever is released and the scale is in a condition for weighing operations, the illuminating element is energized.

It is the object of the present invention to provide an actuator for the switch of such an illuminating circuit that simultaneously upon unlocking the scale beam or lever, the illuminating circuit will be closed and, when the scale beam or lever is locked, the illuminating circuit will be opened.

It is a further object of the invention to include in a device of the character mentioned, a flexible connection between the switch lever and the operating device, whereby the switch lever is operated as the operating device is manipulated, without damage to the switch mechanism.

With the foregoing, as well as additional advantages in view, my invention consists in the novel features of construction and arrangement of parts hereinafter more fully described, reference being made to the accompanying drawing, in which, Fig. 1 is a front elevation.

Figure 1:
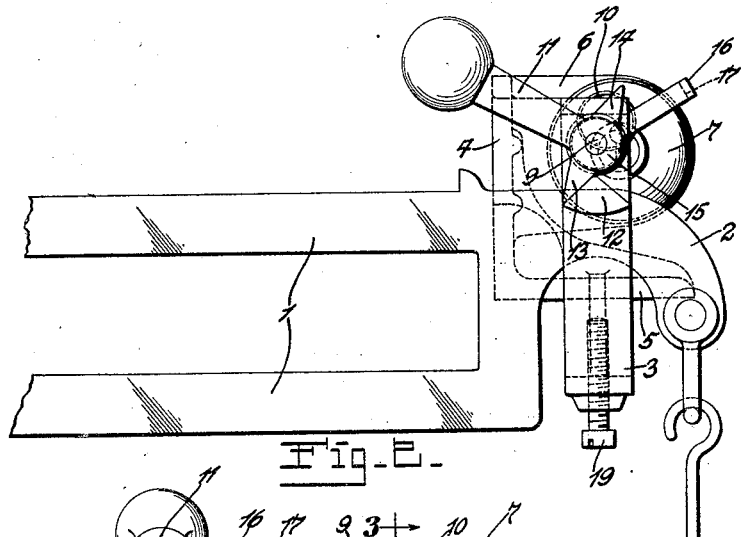
Figure 2:
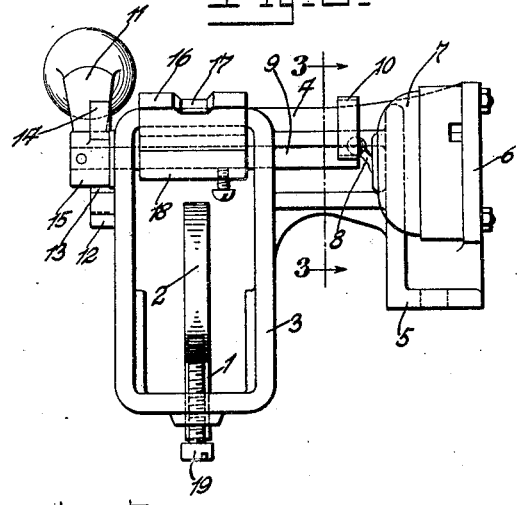
Fig. 2 is an end view.

In the embodiment of the invention illustrated in the drawing, the beam or lever 1 of the scale is of the usual type having a downwardly curved extension 2. The scale beam or lever 1 may be graduated or the weight may be indicated by projecting mechanism such as shown, for example, in the patent to Schaper No. 1,402,970, dated January 10, 1922.

The projection 2 of the scale beam or lever extends through a loop 3 supported by a bracket including a curved arm section 4 integrally formed with the loop and with an angle plate 5. The bracket is rigidly supported on some permanent part of the scale housing or upon a post or standard supported by some rigid part of the scale mechanism. The member 5 carries a vertically disposed plate 6 that constitutes a mounting for a switch housing 7. The switch mechanism contained in the housing 7 is of the usual lever switch type and is operated to open or closed position by raising or lowering a switch lever 8 that projects through the forward face of the switch housing.

As has already been made clear, the switch controls the illuminating circuit that may be utilized either for throwing a light upon the graduated beam or scale, for illuminating a dial, or for operating the illuminating element of a projecting mechanism such as is incorporated in the construction of the patent above mentioned.

As is known, the lever type of switch has trigger mechanism for throwing the contact members of the switch from open or closed positions and that excessive overpressure or jar upon the switch lever will cause damage to the switch mechanism. The elimination of overpressure in operation of the switch lever is avoided by the construction about to be described.

Figure 3:
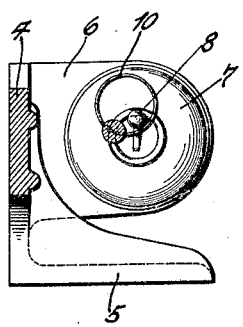
Fig. 3 is a section on the line 3—3 of Fig. 2.

Extending transversely through the upper part of the loop 3 is a shaft 4, the inner end of which terminates adjacent to the switch lever. This shaft carries a loop 10 preferably formed of steel tape or other flexible material. The axis of the shaft 9 is offset from the switch lever and the loop 10 is eccentrically carried in respect of the shaft so that the axis of the loop is approximately concentric with the switch lever. This relation of parts is clearly shown in Fig. 3 of the drawing.

The shaft 9 is operated by a weighted handle 11 mounted on the forward end of the shaft and exteriorly of the loop 3. The extent of throw of the handle 11 and therefore of the rotation of the shaft 9 is controlled by an angular abutment member comprising a lug 12 formed integrally with the front arm of the loop 3. This abutment member cooperates with oppositely disposed projections 13 and 14 carried by a hub 15 of the operating handle. A plate 16 having a notch 17 in its lower edge and formed integral with a hub 18 is disposed intermediate the vertical arms of the loop 3 and over the projection 2 of the scale beam or lever, it being understood that the shaft 9 extends through and is releasably connected with the hub 18 of the plate. When the handle 11 is thrown to the position shown in the views of the drawing, the latch plate is raised, permitting the oscillation of the beam or lever of the scale and, at the same time, the switch lever is in raised position which corresponds to the closed position of the switch mechanism. This adjustment of parts is obviously the operating adjustment for the scale when in service. By throwing the handle 11 to the opposite position shown in the views of the drawing, the latch plate is moved to a vertical position over the extension 2 of the scale beam or lever, the notch 17 fitting over the upper edge of said extension and thereby holding the beam or lever against movement. By the movement of the handle 11, the shaft 9 is rotated, thereby causing the switch lever to be moved to its lower position through the connection of the flexible loop 10. There is sufficient resiliency and flexibility in the loop to prevent any overpressure or jar in the operation of the switch lever. Furthermore, if, by reason of the shaft 9 and the switch lever being out of alinement through misadjustment or by reason of wear of any of the parts, the relationship of the loop 10 to the switch lever 8 permits the operation of the switch lever 8 without damage regardless of the accuracy of the adjustment.

A set screw 19 extends through the lower wall of the loop 3 and is adjustable to constitute an abutment to limit the downward movement of the scale beam or lever.

From the foregoing description, it will be understood that the invention constitutes an efficient operating mechanism for a switch which is coordinated with the latch device for the main beam or lever and that, by reason of the flexible connection between the actuator for the switch lever and the switch lever, the same may be operated indefinitely without damage to the switch mechanism.

I am aware that the invention may be modified in certain particulars without departing from the spirit and scope of the invention, but what I claim and desire to secure by Letters Patent is:—

1. In a scale, the combination of an oscillating beam, an electric switch disposed adjacent to said beam, said switch including a movable lever for operating the switch mechanism, a latch for locking the scale beam against movement, and a flexible connection between the latch operating mechanism and the switch lever whereby the movement of the latch simultaneously operates the switch lever to a corresponding position.

2. In a scale, the combination of a scale beam, an electric switch operable by an oscillating switch lever, a beam latch, an actuator for the beam latch, and a flexible connection operated by said actuator for raising and lowering the switch lever simultaneously with the operation of the latching mechanism.

3. In a scale, the combination with an oscillating beam, of an electric switch including a switch lever movable in a vertical path, a swinging latch plate, a shaft on which said plate is mounted, and a flexible metallic loop carried by said shaft and moving in an orbit about the switch lever whereby when the latch plate is moved, the switch lever will simultaneously be actuated.

4. In a scale, the combination with an oscillating scale beam, of a support arranged adjacent to said beam, an electric switch carried in said support having a movable lever member, a manually operable device pivotally mounted in said support, said device having a latch for locking and unlocking the scale beam, and a flexible connection between said device and said switch lever for operating said switch lever when said latch device is operated.

FRED B. HAMBLIN.